(12) United States Patent
Ritter

(10) Patent No.: US 6,859,650 B1
(45) Date of Patent: Feb. 22, 2005

(54) MOBILE DEVICE, CHIP CARD AND METHOD OF COMMUNICATION

(75) Inventor: Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/445,825

(22) PCT Filed: Jan. 30, 1998

(86) PCT No.: PCT/CH98/00036

§ 371 (c)(1),
(2), (4) Date: Dec. 14, 1999

(87) PCT Pub. No.: WO98/58510

PCT Pub. Date: Dec. 23, 1998

(30) Foreign Application Priority Data

Jun. 16, 1997 (WO) .............................. PCT/CH97/00237
Nov. 19, 1997 (CH) ............................................. 2673/97

(51) Int. Cl.⁷ ........................ H04M 11/00; H04M 3/00; H04M 7/00; H04Q 7/20; H04B 7/00
(52) U.S. Cl. ...................... 455/406; 455/411; 455/419; 455/432; 455/435; 455/500; 455/550; 455/551; 455/558; 235/380; 235/486; 235/492; 380/266; 702/186
(58) Field of Search ............................... 455/558, 419, 455/435, 432, 406, 550, 551, 411; 380/266; 235/486, 492, 380; 439/500; 702/186

(56) References Cited

U.S. PATENT DOCUMENTS 3,581,019 A  *  5/1971  Ryan ........................... 455/558
4,626,892 A     12/1986 Nortrup et al.
5,201,067 A     4/1993  Grube et al.

(List continued on next page.)

FOREIGN PATENT DOCUMENTS

| WO | 96 25828 A | 8/1996 |
| WO | 96/25828 | 8/1996 |
| WO | 96 32700 A | 10/1996 |
| WO | 96/32700 | 10/1996 |
| WO | 96 38814 A | 12/1996 |
| WO | 96/38814 | 12/1996 |
| WO | WO 98/28900 | 7/1998 |

OTHER PUBLICATIONS

Guthery, "JAVA CARD: Internet Computing on a Smart Card", IEEE Internet Computing, Feb. 1997, XP00207764, pp. 57–59.

Combaniere, "Nouvelles Possibilit S de Paiement", REE: Revue Generale de L Electricite et de L Electronique, No. 4, Oct. 1, 1995, XP000533330, pp. 57–65.

Primary Examiner—William Cumming
(74) Attorney, Agent, or Firm—Oblon, Spivak, McClelland, Maier & Neustadt, P.C.

(57) ABSTRACT

A mobile apparatus includes a removable SIM chip card having data-processing means intended among other things for storing identification data of a subscriber in a GSM mobile radio network. The mobile apparatus has additionally at least one wireless interface integrated in the housing. The interface may be infrared or inductive. By means of this interface, the SIM card can communicate directly, without making use of the mobile radio network, with an outside device in both directions. The chip card contains additionally a communication controller to encrypt data and transmit them via the interface. The contactless interface may preferably be fed independently of the mobile apparatus.

18 Claims, 2 Drawing Sheets

U.S. PATENT DOCUMENTS

| | | | | |
|---|---|---|---|---|
| 5,335,276 A | * | 8/1994 | Thompson et al. | 380/266 |
| 5,418,837 A | * | 5/1995 | Johansson et al. | 455/558 |
| 5,485,505 A | * | 1/1996 | Norman et al. | 455/419 |
| 5,657,373 A | * | 8/1997 | Hermansson et al. | 455/435 |
| 5,669,069 A | * | 9/1997 | Rautila | 455/558 |
| 5,831,256 A | * | 11/1998 | De Larminat et al. | 235/486 |
| 5,884,168 A | * | 3/1999 | Kolev et al. | 455/432 |
| 5,887,266 A | * | 3/1999 | Heinonen et al. | 455/558 |
| 5,999,832 A | * | 12/1999 | Vannatta et al. | 455/575.1 |
| 6,021,332 A | * | 2/2000 | Alberth et al. | 455/552.1 |
| 6,043,626 A | * | 3/2000 | Snyder et al. | 320/113 |
| 6,078,806 A | * | 6/2000 | Heinonen et al. | 455/406 |
| 6,199,762 B1 | * | 3/2001 | Hohle | 235/492 |
| 6,240,301 B1 | * | 5/2001 | Phillips | 455/550 |
| 6,244,894 B1 | * | 6/2001 | Miyashita | 439/500 |
| 6,356,769 B1 | * | 3/2002 | Vehmas et al. | 455/551 |
| 6,404,168 B1 | * | 6/2002 | Shoji | 320/134 |
| 6,418,326 B1 | * | 7/2002 | Heinonen et al. | 455/558 |
| 6,456,859 B1 | * | 9/2002 | Desblancs et al. | 455/558 |
| 6,480,725 B2 | * | 11/2002 | Cassidy et al. | 455/558 |
| 6,484,022 B1 | * | 11/2002 | Findikli et al. | 455/411 |
| 6,493,553 B1 | * | 12/2002 | Rollender | 455/435 |
| 6,501,246 B2 | * | 12/2002 | You et al. | 320/114 |
| 2002/0069037 A1 | * | 6/2002 | Hendrickson et al. | 702/186 |
| 2002/0175207 A1 | * | 11/2002 | Kasef et al. | 235/380 |

\* cited by examiner

MOBILE DEVICE, CHIP CARD AND METHOD OF COMMUNICATION

This application is the national phase of international application PCT/CH98/00036 filed Jan. 30, 1998.

FIELD OF THE INVENTION

The present invention relates to a mobile apparatus according to the characterizing clause of patent claim 1. In particular, the present invention relates to a mobile apparatus, for example a radio telephone or a computer, having expanded communication possibilities.

BACKGROUND OF THE INVENTION

In mobile telephone networks, as for example in the GSM network (Global System for Mobile Communication) or in a UMTS network (Universal Mobile Telecommunication System), the identity of the subscriber is stored in a chip card, which is often called a SIM card (Subscriber Identity Module), inserted in the mobile apparatus. The SIM card is removable so that the user can receive the calls intended for him on the mobile apparatus of his choice by transferring the SIM card from one apparatus to another. Moreover, methods are known for loading the SIM card with a sum of money in various ways, as well as for charging the telephone communication fees to that sum.

The SIM cards exist today in two standardized formats.

The "full-size" format corresponds to the size of a credit card, while the "plug-in" format, which is specially adapted to the miniaturized portable telephones, is about 25 mm×10 mm in size. The functionalities of the cards having these two formats are identical.

The SIM cards generally contain data-processing means, usually a GSM microcontroller integrated in a chip. These processing means contain, on the one hand, a zone having a read-write area and a secured memory area which allows the storing of programs and/or files, especially the identification data of the subscriber who possesses the card, as well as calculating and processing means capable of executing various algorithms, especially algorithms which permit the carrying-out of the subscriber identification and of the communication encryption.

This architecture of the SIM cards is very "open" since various enhanced services (VAS, Value-Added Services) have been considered which can take full advantage of the functionalities of these cards. In particular, numerous services have been considered which use the memory available on the SIM cards and/or the processing possibilities of the microcontroller on the card for expanding the functionalities of the contactless telephones.

New data or new programs which are necessary for carrying out these new value-added services may generally be loaded on the card in one of the following three ways:

1) by inserting the card in a suitable read-write device for chip cards. The data originally loaded, i.e., before the card is delivered to the customer, are generally loaded in this way. Since suitable read-write devices are not available everywhere, this method is applicable only to a limited extent for the update or completion of the information already stored on the card. Moreover, the SIM card must be withdrawn from the mobile apparatus in order to insert it in another device, which is not very practical, especially with the very small "plug-in" cards which are not very practical to handle.

2) by keying in data directly on the keypad of the mobile apparatus. By reason of the greatly reduced size of the keypads normally used for mobile telephones, as well as the limited number of keys, this solution is suitable only for entering very brief data, for example for a password, a sum of money, or an answer of the yes/no type during the running of the program by the microcontroller of the card, but on no account for entering complete programs on the SIM card.

3) The data and/or programs may be downloaded on the mobile apparatus, for example with SMS (Short Message System) or USSD (Unstructured Supplementary Service Data) short messages. Patent document EP689368 in the name of the applicant describes technology which makes possible the transmission of data and programs to a mobile apparatus in a transparent manner and in both directions. However, this type of transmission can take place only from another apparatus connected to the mobile radio network, for example from another mobile telephone. Data and programs can also be downloaded as a component of JAVA applets.

Patent application WO 98/28900 in the name of the applicant describes a method of ordering products or information by means of a mobile station. A code designating the product and its supplier must be entered in the mobile station and is then transmitted to the product supplier together with the subscriber's identification data in the form of short messages over the mobile radio network. The product code must comprise a large number of alphanumerical characters so that the product and the product supplier are unambiguously designated. Moreover, parity characters are necessary in order to recognize or correct possible errors in the product code. None of the above-mentioned loading method proves to be really suitable for entering these codes comfortably in the mobile apparatus.

Conversely, a certain number of new value-added services require that access may be had to the data or programs stored on a SIM card from an outside device, for example from another telephone.

In patent application WO 96/25828, a method and a mobile apparatus are described by means of which various types of applications can be run, one application of a first type being a passive application, while an application of a second type can control the master control unit of the mobile apparatus. The mobile apparatus described in WO 96/25828 comprises, in addition to the master control unit, a user interface, a radio module, an audio module, a feed module, and a connection unit for application modules which are executed as a chip card, which can also contain a SIM module, also a contactless interface, for instance an infrared interface or an inductive interface, via which the mobile apparatus can exchange data, which may in particular also be stored in an application module, with an outside device, for instance another mobile apparatus. The feed part described in WO 96/25828 comprises batteries, the charge status of which is monitored by the feed part, the feed part informing the user of the mobile apparatus when the charge status of the batteries drops below a certain value. If the batteries of the mobile apparatus described in WO 96/25828 are discharged, however, no data transmission via the contactless inteface can be carried out with an outside device.

SUMMARY OF THE INVENTION

It is consequently an object of the invention to propose a device and a method for communication which are suitable for the two-way transmission of data and programs to or from a chip card in a mobile apparatus.

It is a further object of the invention to propose a telecommunication system which does not exhibit the inadequacies of the systems of the prior art.

In particular, the objects of the invention are achieved with the aid of a mobile apparatus, for example with a GSM mobile radio telephone, which has at least one contactless interface making it possible for the processing means of the card inserted in the apparatus to communicate directly with an external device situated outside the mobile apparatus.

By means of this invention, mobile telecommunication networks can be linked with other networks or systems.

In a first embodiment of the invention, the contactless interface has at least one infrared transceiver disposed on the housing of the mobile apparatus. Direct communication between the chip card and an outside device then consequently takes place via this infrared interface.

In one embodiment of the invention, the contactless interface has at least one coil integrated in the housing of the mobile apparatus. Direct communication between the chip card and an outside device then consequently takes place via electromagnetic waves.

A communication controller disposed on the SIM card or in the housing makes it possible to store data transmitted through this interface directly on the SIM card.

Thus, data may be written on the chip card or read out from the card through an outside device, for example another contactless telephone or any desired data-processing device.

The present invention likewise relates to various methods and services which may be applied by means of a mobile apparatus according to the present invention.

BRIEF DESCRIPTION OF THE DRAWINGS

The present invention is better understood with the aid of the description given by way of example and is illustrated by the enclosed figures, which show the following.

Figure 1:
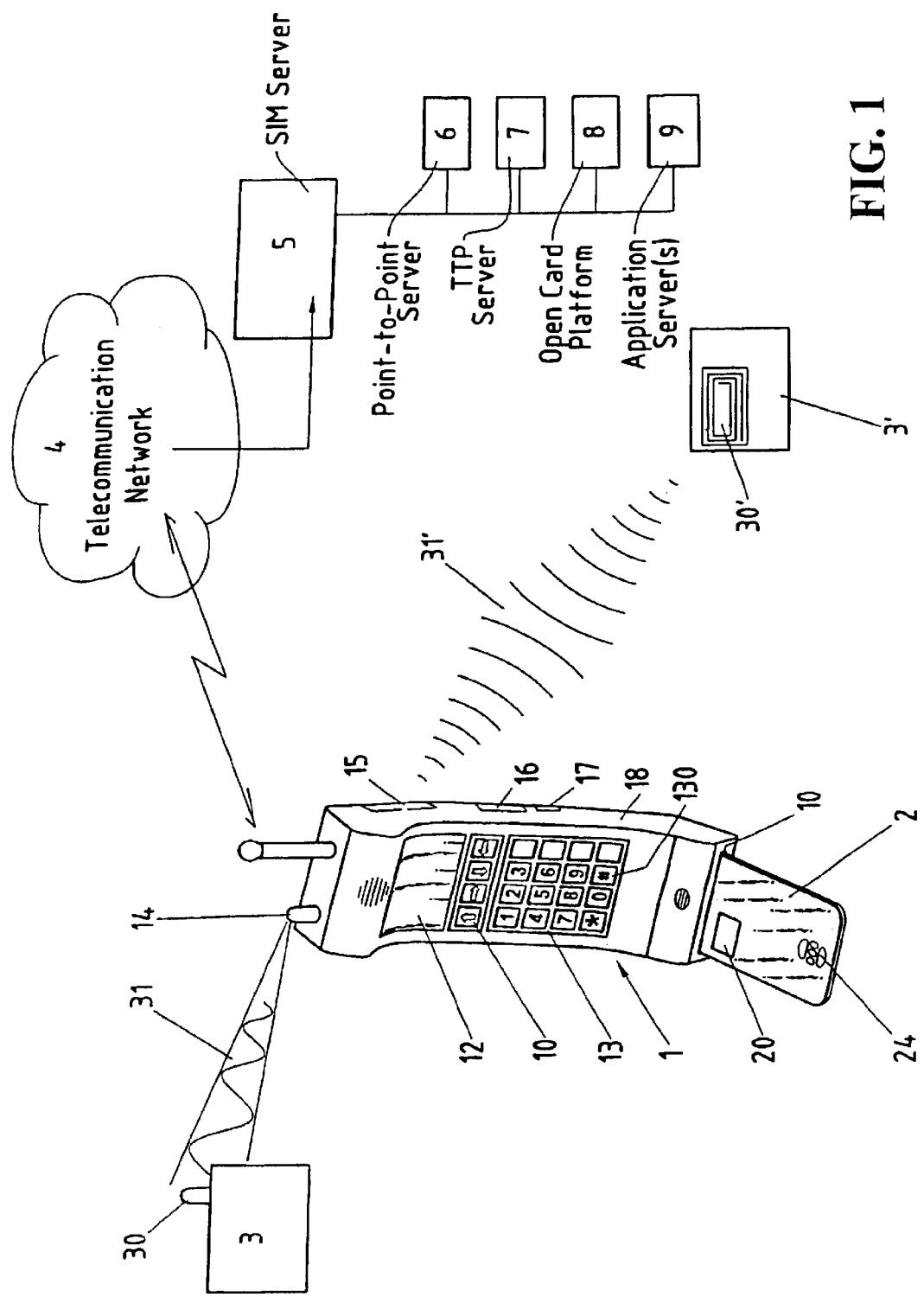
FIG. 1 a diagrammatic and perspective view of a first embodiment of the system of the invention.

Represented by reference numeral 1 is a mobile apparatus, for example a GSM mobile radio telephone or a portable computer having communication possibilities in a mobile radio network. The mobile apparatus has a housing 18, a keypad 13, and a display 12. Besides normal number keys, the keypad 13 preferably contains at least one confirmation key 130 as well as cursor control means 10.

The mobile apparatus 1 may be utilized in a conventional mobile radio network 4, for example a GSM network, in order to transmit languages and data. The mobile apparatus 1 has a conventional receiving location for the insertion of a removable identification card 2, for example a SIM card 2 (Subscriber Identity Module) which identifies the user in the telecommunication network 4. SIM cards are already utilized now in GSM, DCS, or PCS mobile apparatus, among other things, or also in future fixed networks having subscriber identification by chip cards. The SIM card may be either a full-size card or a plug-in card; it is connected to the end apparatus 1 by a contact region 24 on the surface of the card. Other card formats, as well as contactless SIM cards, may, however, likewise be used within the scope of this invention. The SIM card 2 contains data-processing means, for example a known GSM-SIM microcontroller 20. SIM cards are described, for example, in the technical specification GSM 11.11 and GSM 11.14, which has been obtainable since 1995 and 1996, respectively, from the Secretariat of the European Telecommunications Standards Institute, F-06921 Sophia Antipolis. Other identification cards, for example multi-purpose cards known by the term Opencard, may also be utilized in this invention.

The data-processing means 20 are intended among other things for storing identification data of a subscriber of the said mobile radio network. As identification data, the IMSI (International Mobile Subscriber Identity), the MSISDN (Mobile Station Identity Number), and/or the IDUI (International Debit User Identification) of the user of the telecommunication network 4 may, for example, be used.

According to the invention, the mobile apparatus 1 contains at least one additional two-way interface such as, for example, an infrared interface having an infrared transceiver 14 on the housing 18. By means of this interface, the mobile apparatus and an outside device 3 can exchange data and programs with each other contactlessly and without making use of the mobile radio network 4.

The interface contains additionally an integrated communication controller 16 to control the infrared LED diode 14 and to send and receive data by means of this diode. The communication controller is responsible, among other things, for the serial transmission protocol, for example RS232, over the interface 31. Moreover, the communication controller has communication means for exchanging data with the GSM controller 20 on the chip card via the contact region 24. These communication means may, for example, comprise registers or memory areas which the GSM microcontroller 20 can access with special software by means of the contacts 24. Conversely, the communication means may also comprise software applications for reading and writing data in the memory area of the GSM controller 20. Data or programs can thereby easily be transmitted between an outside device 3 and a memory area accessible to the GSM controller 20. Data from the outside device 3 may, for example, be downloaded on the chip card, and conversely, the outside device 3 can directly use or access the data stored on the chip card 2 without thereby having to use the mobile radio network 4.

The interface 14, 16 is preferably fed by an independent power storage 17, for example by a storage battery or a capacitor. The interface can thereby also be used if the batteries of the mobile apparatus 1 are discharged or if the mobile apparatus is switched off. Preferably, however, the interface may also be electrically supplied from the main battery of the mobile apparatus if it suffices.

Instead of the infrared transceiver 14, or preferably in addition to this transceiver, the mobile apparatus in one modification contains another two-way interface, in this case an antenna 15 integrated at the back of the housing 18. By means of this interface, the mobile apparatus can likewise exchange data and programs inductively or electromagnetically directly with an outside device 3' without making use of the mobile radio network 4. As an antenna, a coil may for instance be used, which may, for example, be made by winding of a wire, by printing or etching of a conductor film, or with strip lines. Depending on the application, a transmission frequency of, for instance, 125 kHz, 13.56 MHz, 400 MHz, or 5.2 GHz is used, the applied frequency also being dependent on the data-transmission rate needed. A frequency of about 13.56 MHz is preferred, however, in order to ensure compatibility with bank applications. The antenna is integrated in the housing in such a way that the absorption is kept as small as possible and that a transmission with the chosen frequency is also possible.

The second interface 15 is preferably likewise controlled by the communication controller 16. If an infrared interface 14 and an inductive/electromagnetic interface 15 are both integrated in the same mobile apparatus 1, the same controller 16 is preferably responsible for both interfaces. Data or programs may thereby be transmitted in both directions between an outside device 3 or 3' and the processor 20 on the card either via the infrared interface 14-31 or via the inductive/electromagnetic interface 15-31', as will be explained in detail below.

If the mobile apparatus 1 according to the invention is used as an identification means for an outside system 3', for example as an electronic doorkey, a copy of the identification stored in the communication controller 16 is preferably loaded into the secured area of the SIM card 2, and an update mechanism is provided for updating the identification stored in the controller 16 with the identification from the SIM card if the mobile apparatus is utilized with another SIM card. Thus, the SIM card can also be utilized as an identification means in another apparatus after an update.

Figure 2:
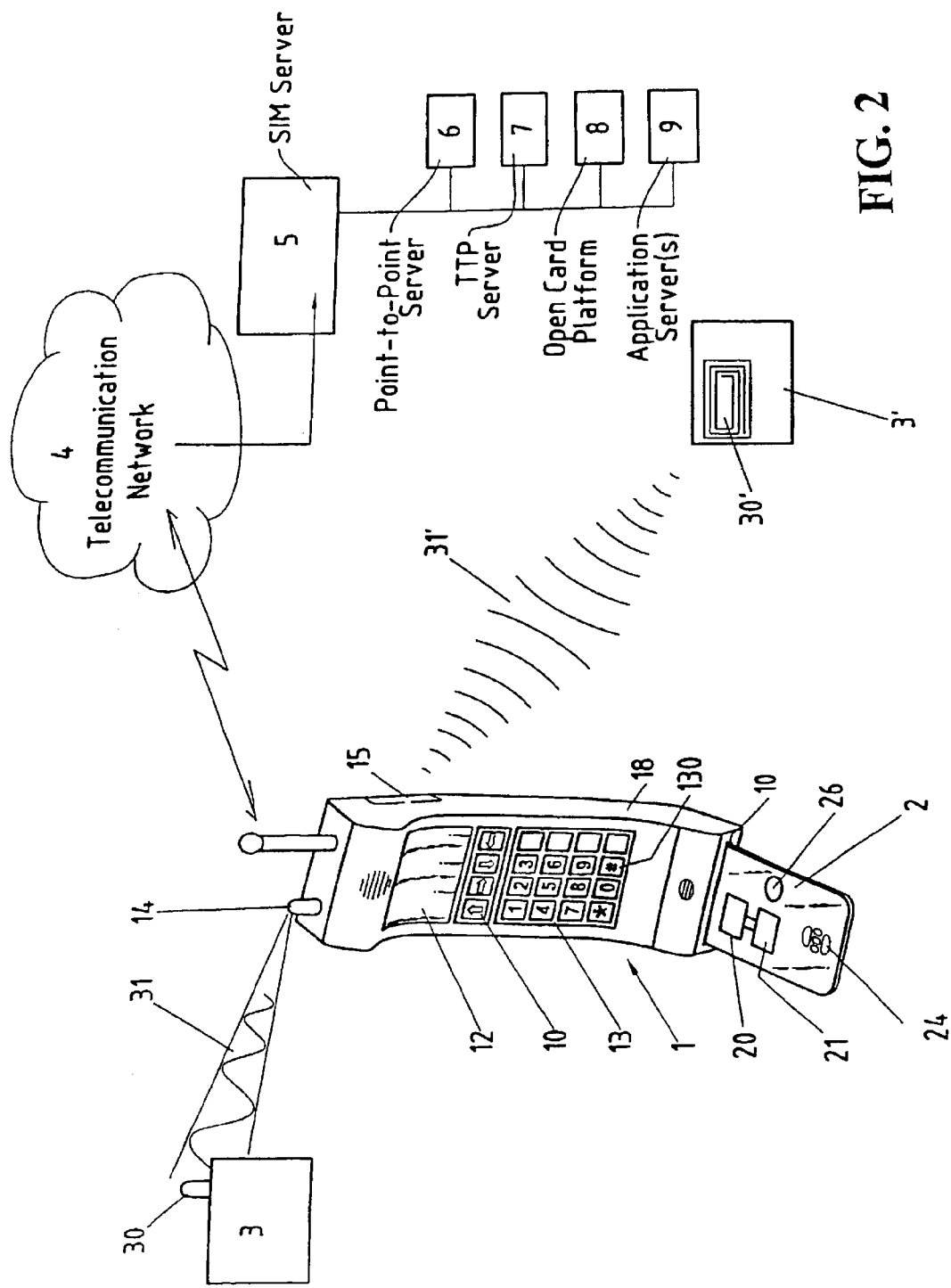
FIG. 2 a diagrammatic and perspective view of a second embodiment of the system of the invention.

FIG. 2 shows another modification of the system according to the invention, in which a communication controller 21 for the infrared and/or inductive/electromagnetic transceiver 14/15 is integrated in the chip card 2 instead of in the mobile apparatus 1. The communication controller may, as in the first modification, activate the transceiver 14/15 directly, this time via the contact region 24. An independent power storage 26 for the communication controller and for the transceiver 14/15 is preferably likewise integrated in the card 2 so that the communication controller 21 can work independently of the mobile apparatus 1 and of the GSM controller 20. The interface 15 and the communication controller 16 or 21, respectively, may also be supplied with power from the outside device through the inductive interface 31'. In this case, the inductively transmitted power is preferably stored in a storage capacitor 16/26 in the mobile apparatus or on the card.

The communication controller 21 preferably comprises only one integrated chip 21 which is connected directly to the conventional GSM microcontroller 20. This arrangement permits the use of standard microcontrollers 20, which are available at low prices, and to attach a specific communication module thereto. The specialist will realize, however, that it is just as possible to integrate the communication controller 21 in the same integrated circuit as the GSM microcontroller 20.

The communication controller 21 or 16, respectively, may comprise encryption and signing means to decrypt received data and to encrypt and sign sent data. Thus, the connections through the infrared interface 31 or 31', respectively, can be secured. The TTP method (Trusted Third Party) or a point-to-point method (PTP) may, for instance, be utilized as an encryption method.

In a preferred modification, the encryption and signing means are utilized to secure SMS or USSD messages through the mobile radio network 4. In this case, these means are preferably integrated in the GSM processor 20 instead of in the communication controller 21/16.

As already mentioned, the SIM card 2 is connected to the mobile radio network 4, for example to a GSM network, when it is inserted in the mobile apparatus 1. A SIM server 5 for administering short messages (SSC, Short Message Service Center) is likewise connected to the network 4; the SIM server 5 is equipped in such a way that it can communicate with the SIM card 2 over the mobile radio network 4 by means of special SMS and/or USSD short messages. Known filter means in the SIM server and in the SIM cards permit carrying out special services, such as the exchange of the files, instructions, and programs between the SIM server and a SIN card. The SIN server is operated by a SIM operator who, as a rule, also manages the communication network 4.

A TTP server 7 is likewise connected to the SIM server 5 for encrypting at least certain special short messages and thereby to guarantee that the confidentiality, authenticity of identity, authenticity of information, integrity, and undeniability of the origin are ensured. A point-to-point server 6 may also be utilized to encode or decode encrypted short messages with a point-to-point method.

The SIM server is furthermore preferably connected to an OpenCard platform 8 in order to be able to use the SIM card in an OpenCard system as well. The OpenCard system is a standardized system proposed by International Business Machines Corporation, Inc., Netscape, NCI, and Sun Microsystems Inc., which allows the interconnection of different chip cards on different hardware and software platforms. The mobile apparatus 1 according to the invention and the SIM card 2 according to the invention can thereby also be utilized in an OpenCard-compatible environment, for example in an NC network (Network Computer). Java applets downloaded from a platform 8 and through the network 4 may then be run by the processing means 20, 21 or transmitted on by the latter through the interface 31, 31' to an outside device 3, 3'.

Various service providers and application servers 9 are additionally connected to the SIM server 5 for managing diverse value-added services (VAS, Value Added Services). For example, one or more application servers 9 may be managed by a financial institution in order to be able to carry out money transactions with the mobile apparatus 1.

The chip card 2 according to the invention preferably contains several private and public electronic keys which permit access to the OpenCard platform and to several services 8, 9. Electronic keys may also be provided for communicating with outside devices 3, 3'. These various keys are preferably stored in a secured memory area of the GSM controller 20 and/or of the communication controller 21. Thus, the user can reliably identify himself in several systems and for various services.

We shall now discuss six different functional modifications of the mobile apparatus according to the invention. A certain mobile apparatus 1 having a certain chip card 2 can, depending upon equipment and loaded application software, carry out either all or only some of these modes of function.

1) Independent feeding of the inductive interface, no functional linking to the GSM microcontroller 20.

In this case, the communication controller 16 or 21, respectively, is inductively fed by the outside device 3' or by means of the inside storage battery 17 or 26, respectively. It is not permanently logically linked to the GSM microcontroller 20. The outside device can feed the communication controller and the antenna 15 to read identification data or electronic keys in the memory area of the communication controller, for example. The infrared interface 14 is not used. This mode may be useful, for example, in order to make use of the likewise switched-off mobile apparatus as an electronic key with an admittance-checking device.

If the GSM microcontroller 20 is again fed, logical data, for example user data or configuration data, can again be exchanged between the two controllers. An electronic key with a TTP-secured document, for example, can thereby be transmitted by the network 4 to the chip card 2, received and stored by the GSM controller 20, and used by the communication controller 16 or 21, even if the GSM functions of the mobile apparatus are not available during such use.

2) Independent feeding of the inductive interface, functional linking to the GSM microcontroller 20.

Similarly, in this case the communication controller 16 or 21 is also fed inductively by the outside device 3' or by means of the inside storage battery 17/26. The infrared interface is likewise not used. However, the communication controller is permanently logically connected to the GSM microcontroller 20. Through the interface 31', the transmission process can thereby also make use of the data in the memory area of the GSM controller 20 and the functions of this controller and of the mobile apparatus. For example, data elements can be received via the interface 31', the signature be checked, and these data elements be further processed by the GSM processor and/or be forwarded on.

3) Feeding of the inductive interface with the mobile apparatus.

The communication controller 16/21 and the inductive/electromagnetic interface 15 are fed by the main battery of the mobile apparatus 1. The infrared interface is not used. Data and programs can thereby be inductively transmitted over greater distances. There is preferably a permanent link between the GSM controller 20 and the communication controller 21.

If the feed inside the apparatus fails, for example if the batteries have run down or if the mobile apparatus is switched off, the first mode is preferably activated automatically.

4) Independent feeding of the inductive interface, infrared interface active.

The infrared transceiver 14 and the communication controller 16/21 are both fed by the main battery of the mobile apparatus 1. The inductive interface 15 is used only if it is fed by an outside device 3'. There is preferably a permanent link between the GSM controller 20 and the communication controller 21.

This mode is preferably activated by the user for communicating with outside infrared-capable devices 3. It is sensible, however, if this mode is not activated by default.

5) Feeding of the inductive interface by means of the mobile apparatus, infrared interface active.

This mode is a combination of modes 3 and 4. Data can be transmitted over longer distances between the mobile apparatus 1 and an outside device 3/3' either simultaneously or via the inductive and via the infrared interface. There is preferably a permanent link between the GSM controller 20 and the communication controller 21.

6) Transparent mode

The GSM controller 20 and the communication controller 21 are permanently logically connected. After a connection has been established with an outside device 3 or 3', either via the infrared interface 31 or via the inductive interface 31', the data are transmitted transparently over the mobile radio network 4. It is thereby possible to establish via the mobile apparatus 1 a transparent data flow in both directions between the SIM server 5 and an outside device 3, 3'.

The outside device 3 or 3', respectively, may be formed, depending on the application, by any desired apparatus provided with a transceiver 30 or 30', respectively, which permits communicating directly via infrared or inductively/over radio waves, respectively, with the mobile apparatus 1, without making use of the mobile radio network. In the simplest case, the outside device 3, 3' may consist of a further mobile apparatus according to the invention. Thus the invention allows any desired type of data or programs to be exchanged which are stored on the SIM cards of the two mobile apparatus. Depending upon the type of SIM card and depending upon the management programs of these two cards, it is for example possible to transmit or to copy programs and/or data from one card to the other. If the card contains a sum of money from which the communication fees are deducted, it is also possible with a suitable communication program to transmit some or all of the remainder from one card to the other and thus to load a chip card with the sums available on another card.

In one application modification of the invention, the outside device 3, 3' is formed by a computer or a terminal provided with a transceiver 30 or 30', respectively. In this case, the device 3, 3' is preferably provided with data-entry means, not shown, for example with a keyboard, and with data-display means, not shown, for example with a display (screen). The device 3, 3' may furthermore be connected to a communication network, not shown, for example via a modem, not shown, to an "Internet" or "Intranet" network, or to any type of fixed or mobile communication network. Data or programs entered in the device 3, 3' may then be copied to the chip card 2 via the interface 31, 31', in the opposite direction, the data stored on the card may be transmitted to the display of the device 3, 3' and indicated there.

An interactive dialog, consisting of a sequence of communications in each direction, is likewise possible between the chip card 2 and a computer 3, 3'. A possible application of such a dialog relates to the choice of an option in a menu indicated on the display of an outside device 3, 3' with the aid of the mobile telephone. In this case, the display of the device 3, 3' displays a menu, for example a list of products proposed for sale or of information. The user of a mobile apparatus 1 according to the invention can control the position of a cursor in this menu through actuation of the cursor-movement keys 13 on the keypad of his mobile telephone. The cursor-movement instructions are sent to the device 3, 3' with the aid of the interface according to the invention. The user actuates a confirmation key, for example the # key, on his keypad to declare the chosen menu option valid, for example to order a product. The confirmation command is transmitted in the same way to the device 3, 3', which then executes a routine corresponding to the chosen option. The routine executed may for example comprise the establishment of a communication with the supplier, as well as the transmission of the order to this supplier. In one modification, the routine executed upon confirmation of a menu option comprises the sending of a reply through the interface 31, 31' to the chip card 2, for example an identification code of the chosen product. At least some of the data contained in this reply, for example the identification code of the product ordered, are then stored on the chip card 2. The application program loaded on the chip card may then, for example, send the product supplier a communication, for example a short message (Short Message SMS or USSD message) containing this product identification code. Various other possibilities of product orders are described, among other things, in the above-mentioned patent application WO 98/28900.

The mobile apparatus according to the invention may naturally also be used not only to control the position of an object but also to control several properties, e.g., position, color, shape, function, visibility, etc., of one or more objects.

In the case where the menu on the display of the device 3 corresponds to an "Internet" or "Intranet" page which is displayed by a suitable "browser," for example, the communication between the chip card and the device 3 preferably contains instructions in the JAVA language (registered trademark of SUN MICROSYSTEM), which can be directly interpreted by the said "browser." Conversely, it is likewise desired that the processing means 20, 21 comprise a Java interpreter in order to be able to execute instructions in the JAVA language. Other preferably object-oriented languages, such as Corba or C++, for instance, might also be used.

The outside device 3, 3' may, for instance, also be a POS apparatus (Point of Sale), for example an automated teller machine or a cashier's desk in a shop. In this case, the direct communication can make it possible, for example, with the aid of the interface 14, 15, to reload the sum of money loaded on the chip card 2 from the POS. The advantage is that the SIM card can be reloaded without having to be extracted from the mobile apparatus 1 and without setting up a connection subject to charge through the mobile radio network 4. A financial transaction may likewise take place in the other direction, by charging the sum of money stored on the chip card 2 with a given amount and by direct transmission of the amount charged with the aid of the contactless interface according to the invention to the outside device 3, 3', for example to an automatic machine or to the POS apparatus in a department store. A transaction in a shop equipped with POS apparatus 3, 3' which are provided with interfaces 30 and/or 30' for communicating with the chip cards according to the invention may thus comprise the following steps:

direct transmission of the amount to be paid via the POS apparatus 3/3' and via the interface 31/31' to the chip card 2, intermediate storage of this amount in the processor 20 of the SIM chip card, execution of a routine by the microcontroller 20 so that the amount to be paid is indicated on the display 12 of the mobile apparatus 1, upon agreement with the number displayed, confirmation of this amount by the customer, for example by pressing the # key.

direct transmission of the confirmation command to the device 3, 3' with the aid of the interface 30, 30'.

The amount to be paid may, for example, be charged immediately to the sum of money stored on the chip card 2. If the sum of money on the card 2 suffices for settling the transaction, the transaction amount may be charged to the card and packed in a document which is transmitted via the contactless interface to the device 3, 3'. These various connections preferably take place signed and encrypted by the above-mentioned TTP or PTP signing and encryption means.

In one modification, the transaction amount may be transferred by any banking or financial institution at which the subscriber is a customer to a bank account of the owner of the device 3. For this purpose, in case of the confirmation of the amount indicated on the display 12, the program loaded on the chip card 2 may contain an instruction for sending out by the mobile apparatus 1 or by the device 3, 3' to a server 9 of a financial institution an SMS or USSD short message containing a charge instruction.

The outside device 3, 3' may also take the form of an admittance-checking device which permits checking the coming and going at a protected location, for example in a factory or within the enclosure of an amusement park. For this application, the chip card 2 may be loaded with an electronic key stored in the memory. In order to obtain admittance to a protected zone, it is therefore necessary for a direct communication to be established between the chip card 2 and the device 3, 3' with the aid of the interface 31, 31'. Admittance to the protected location is then permitted only if it turns out after this communication that the electronic key stored in the card 2 is correct and gives its owner the right to penetrate into the protected zone. In this application, it is advantageous for the communication controller 16 or 21, respectively, be able to function electrically independently of the mobile apparatus 1 so that admittance then becomes possible even if the batteries of the mobile apparatus 1 are discharged.

The use of the resources variously carried out may be subordinated to the payment of a fee. A counter integrated in the SIM card may, for example, count the number of uses of one of the interfaces 14 or 15 and determine a fee from that number. The fee may also be dependent upon the duration of use if the chip card integrates a time-measuring device. The fee to be paid may then periodically either be charged to a money account of the card or packed in SMS or USSD billing documents which are transmitted signed and encrypted to a server 9 of a financial institution and then charged to an account of the user at that institution.

What is claimed is:

1. A communication device comprising:
    a chip card comprising:
        data processing means which make possible the storage of data containing at least identification data of a subscriber of a telecommunication network;
        electrical contacts on the surface of the chip card which make possible the exchange of data between the processing means and a mobile apparatus into which the chip card can be removably inserted;
        a communication controller for controlling the direct exchange of data via a contactless interface integrated into the mobile apparatus between the chip card and, relative to the mobile apparatus, an outside device without making use of the mobile radio network during the data exchange; and
        a power storage for providing power to the communication controller when a battery of the mobile apparatus is exhausted or when the mobile apparatus is switched off.

2. The communication device according to claim 1, wherein the communication controller can activate a serial data transmission via the contactless interface.

3. The communication device according to claim 1, further comprising encryption means in order to make possible the transmission of encrypted data via the contactless interface.

4. The communication device according to claim 1, further comprising signing means in order to make possible the transmission of signed data via the contactless interface.

5. The communication device according to claim 1, wherein one or more private and public electronic keys are stored in a memory area of the card, by means of which keys the chip card can access secured applications through the telecommunications network.

6. The communication device according to claim 1, wherein one or more private and public electronic keys are stored in a memory area of the card, by means of which keys the chip card can access secured, relative to the said mobile apparatus, outside devices through the contactless interface.

7. The communication device according to claim 1, further comprising program means in order to make possible transparent data transmission between the contactless interface and the telecommunication network.

8. The communication device according to claim 1, wherein at least one of the communication controller and the data processing means comprise a Java interpreter for executing instructions in the JAVA language.

9. The communication device according to claim 1, wherein the communication controller, the contactless interface, and the power storage are arranged to form an RFID transponder and wherein the outside device is an RFID transceiver.

10. A chip card comprising:
- a data processing unit configured to store data containing at least identification data of a subscriber of a telecommunication network;
- electrical contacts on the surface of the chip card configured to exchange data between the data processing unit and a mobile apparatus into which the chip card can be removably inserted;
- a communication controller configured to control the direct exchange of data via a contactless interface integrated into the mobile apparatus between the chip card and, relative to the mobile apparatus, an outside device without making use of the mobile radio network during the data exchange; and
- a power storage configured to provide power to the communication controller, the power storage configured to be inductively charged by the outside device.

11. The chip card according to claim 10, wherein the communication controller, the contactless interface, and the power storage are arranged to form an RFID transponder and wherein the outside device is an RFID transceiver.

12. The chip card according to claim 10, wherein the communication controller can activate a serial data transmission via the contactless interface.

13. The chip card according to claim 10, further comprising an encryption unit configured to transmit encrypted data via the contactless interface.

14. The chip card according to claim 10, further comprising a signing unit configured to transmit signed data via the contactless interface.

15. The chip card according to claim 10, wherein one or more private and public electronic keys are stored in a memory area of the card, by means of which keys the chip card can access secured applications through the telecommunications network.

16. The chip card according to claim 10, wherein one or more private and public electronic keys are stored in a memory area of the card, by means of which keys the chip card can access secured, relative to the said mobile apparatus, outside devices through the contactless interface.

17. The chip card according to claim 10, further comprising a program unit configured to transparently transmit data between the contactless interface and the telecommunication network.

18. The chip card according to claim 10, wherein at least one of the communication controller and the data processing unit comprise a Java interpreter configured to execute instructions in the JAVA language.

* * * * *